US011888384B2

(12) United States Patent
Brambilla et al.

(10) Patent No.: US 11,888,384 B2
(45) Date of Patent: Jan. 30, 2024

(54) DC-DC SWITCHING CONVERTER WITH ADJUSTABLE DRIVING VOLTAGES

(71) Applicant: STMicroelectronics S.r.l., Agrate Brianza (IT)

(72) Inventors: Niccolo' Brambilla, Cassina de' Pecchi (IT); Sandro Rossi, Pavia (IT); Valeria Bottarel, Novara (IT); Alessandro Nicolosi, Dresano (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 137 days.

(21) Appl. No.: 17/532,833

(22) Filed: Nov. 22, 2021

(65) Prior Publication Data
US 2022/0166320 A1    May 26, 2022

(30) Foreign Application Priority Data

Nov. 24, 2020   (IT) .................. 102020000028178

(51) Int. Cl.
*H02M 3/158*      (2006.01)
*H02M 1/00*       (2006.01)

(52) U.S. Cl.
CPC ......... *H02M 1/0006* (2021.05); *H02M 3/158* (2013.01)

(58) Field of Classification Search
CPC .. H02M 3/158; H02M 1/0006; H02M 1/0003; H02M 1/08
See application file for complete search history.

(56) References Cited

U.S. PATENT DOCUMENTS

| | | | |
|---|---|---|---|
| 2008/0001553 A1 | 1/2008 | Qiu et al. | |
| 2008/0278135 A1 | 11/2008 | De Lima Filho et al. | |
| 2008/0290911 A1 | 11/2008 | Williams | |
| 2009/0267682 A1 | 10/2009 | Hehemann et al. | |
| 2014/0021932 A1* | 1/2014 | Ejury | G05F 3/02 323/311 |
| 2014/0266091 A1 | 9/2014 | Zuniga et al. | |
| 2014/0266130 A1 | 9/2014 | Chiang et al. | |
| 2015/0008890 A1 | 1/2015 | Sasao et al. | |
| 2015/0222172 A1 | 8/2015 | Thakur | |

(Continued)

FOREIGN PATENT DOCUMENTS

| | | |
|---|---|---|
| CN | 105871180 A | 8/2016 |
| EP | 3109986 A1 | 12/2016 |
| EP | 3709494 A2 | 9/2020 |

*Primary Examiner* — Alex Torres-Rivera
(74) *Attorney, Agent, or Firm* — Slater Matsil, LLP

(57) ABSTRACT

In an embodiment, a switching converter includes: a switching stage including first and second switching devices for receiving an input voltage and for providing an output voltage; a driving stage including first and second driving devices for driving the first and second switching devices, respectively; a current sensing arrangement for sensing an output current provided by the switching stage; a voltage generation arrangement configured to generate a supply voltage for powering the driving stage, the voltage generation arrangement being configured to adjust the supply voltage according to the sensed output current; and a charge recovery stage configured to store a first electric charge being lost from the first driving device during driving of the first switching device and to release at least partially the stored first electric charge to the second driving device during driving of the second switching device.

20 Claims, 6 Drawing Sheets

(56) References Cited

U.S. PATENT DOCUMENTS

| | | |
|---|---|---|
| 2016/0079785 A1 | 3/2016 | Kinzer et al. |
| 2020/0161978 A1* | 5/2020 | Lin .................. H02M 3/158 |
| 2020/0287534 A1 | 9/2020 | Dietrich et al. |
| 2021/0006245 A1* | 1/2021 | Kong .................. H02M 1/08 |

* cited by examiner

DC-DC SWITCHING CONVERTER WITH ADJUSTABLE DRIVING VOLTAGES

CROSS-REFERENCE TO RELATED APPLICATIONS

This application claims the benefit of Italian Patent Application No. 102020000028178, filed on Nov. 24, 2020, which application is hereby incorporated herein by reference.

This application is related to U.S. patent application Ser. No. 17/532,867 filed on the same day as this application, entitled "Switching Converter," and associated with, and claiming the benefit of Italian Patent Application No. 102020000028199, filed on Nov. 24, 2020, which applications are hereby incorporated by reference herein in their entirety.

TECHNICAL FIELD

The present disclosure relates generally to an electronic system and method, and, in particular embodiments, to a switching converter.

BACKGROUND

DC-DC switching converters may be used in any electronic system comprising a power source (such as a battery) and one or more electronic/electro-mechanic components each one operating at a respective voltage. In such an electronic system, the DC-DC switching converter may be configured to generate multiple controlled output voltages from a (single) input voltage provided by the power source. This allows saving space, in that the use of multiple power sources within the electronic system to supply different components thereof is avoided.

Among the switching converters, the switching converters where the output voltage is equal to or lower than the input voltage (also referred to as buck converters or step-down converters) are widely used.

A conventional buck converter comprises a switching stage (for example, a CMOS switching stage), and a driving stage for driving the switching stage.

According to a common implementation, the switching stage comprises a high-side switching device (such as a PMOS transistor) and a low-side switching device (such as a NMOS transistor) alternatively turned on and off according to respective driving signals.

According to a common implementation, the driving stage comprises a high-side driving device (for example, a tapered buffer arrangement) for receiving an oscillating signal (e.g., a pulse width modulated (PWM) signal) and for providing the corresponding driving signal to the high-side switching device, and a low-side driving device (for example, a tapered buffer arrangement) for receiving the oscillating signal and for providing the corresponding driving signal to the low-side switching device.

The high-side and low side driving devices are typically powered with respective supply voltages.

The supply voltages powering the high-side driving device typically comprise a high or relatively high supply voltage (typically, the input voltage) and a low or relatively low supply voltage.

The supply voltages powering the low-side driving device typically comprise a high or relatively high supply voltage and a low or relatively low supply voltage (typically, a ground voltage).

SUMMARY

Some embodiments of the present invention generally relate to the field of switching converters. Some embodiments relate to DC-DC switching converters for converting a direct current input voltage into a direct current output voltage. Some embodiments relate to a switching converter, such as a buck converter, where the output voltage is equal to or lower than the input voltage.

The inventors have understood that the conventional switching converters (such as the conventional buck converters) may not be satisfactory for modern technological requirements, and particularly for applications where high efficiency is desirable or required.

Indeed, the inventors have recognized that, in the prior-art solutions, the low or relatively low supply voltage powering the high-side driving device and the high or relatively high supply voltage powering the low-side driving device are fixed (for example, they may be internally generated or externally provided), and that, therefore, they cannot be used to achieve power loss optimization.

Thus, in the conventional switching converters, driving losses are usually optimized by acting on design parameters of the switching devices. Just as an example, introducing modularity for the switching devices or changing switching frequency are commonly used approach aimed at achieving power loss optimization.

However, introducing modularity for the switching devices may imply a high design complexity for the driving devices, and changing the switching frequency may imply a higher system complexity and huge effort on state machine for managing the switching devices.

The inventors have faced the above-mentioned issues, and have devised embodiments of a switching converter with optimized power losses and reduced complexity. In order to achieve it, the inventors have devised embodiments of a switching converter in which the low or relatively low supply voltage powering the high-side driving device and the high or relatively high supply voltage powering the low-side driving device are variable, and adjustable according to an output current of the switching converter, and where an electric charge being lost from the high-side driving device is at least partially recovered to at least partially compensate for an electric charge being lost from the low-side driving device.

One or more aspects of some embodiments of the present invention are set out in the independent claims, with advantageous features of some embodiments indicated in the dependent claims, whose wording is enclosed herein verbatim by reference (with any advantageous feature being provided with reference to a specific aspect of some embodiments of the present invention that applies mutatis mutandis to any other aspect).

More specifically, an aspect of some embodiments of the present invention relate to a switching converter for converting a direct current input voltage into a direct current output voltage. The switching converter may comprise a switching stage comprising first and second switching devices for receiving the direct current input voltage and for providing the direct current output voltage according to the direct current input voltage. The switching converter may comprise a driving stage comprising first and second driving devices for driving the first and second switching devices, respectively. The switching converter may comprise a current sensing arrangement for sensing an output current provided by the switching stage. The switching converter may comprise a voltage generation arrangement configured to generate at least one supply voltage for powering the driving stage; the voltage generation arrangement may be configured to adjust the at least one supply voltage according to the output current being sensed by the sensing arrangement. The switching converter may comprise a charge recovery stage configured to store a first electric charge being lost from the first driving device during driving of the first switching device and to release at least partially the stored first electric charge to the second driving device during driving of the second switching device, so as to at least partially compensate for a second electric charge being lost from the second driving device during driving of the second switching device.

According to an embodiment, whose features are additional or alternative to any features of the preceding embodiments, the voltage generation arrangement comprises a first voltage generation stage configured to generate, according to the output current, a first supply voltage for powering the second driving device, and a second voltage generation stage configured to generate, according to a reference voltage corresponding to the first supply voltage, a second supply voltage for powering the first driving device. The charge recovery stage may be configured to selectively store the first electric charge according to a comparison between the first supply voltage and the second supply voltage.

According to an embodiment, whose features are additional or alternative to any features of the preceding embodiments, the first and second supply voltages provide a same supply voltage drop powering to the first and second driving devices. The charge recovery stage may be configured to allow the first electric charge to be stored if the second supply voltage is higher than the first supply voltage, or to prevent the first electric charge to be stored if the second supply voltage is lower than the first supply voltage.

According to an embodiment, whose features are additional or alternative to any features of the preceding embodiments, the charge recovery stage comprises at least one among:
  a storage capacitor configured to store the first electric charge;
  a switching unit to selectively allow or prevent the first electric charge to flow into the storage capacitor;
  a comparator unit for operating the switching unit according to a comparison between the first and second supply voltages.

According to an embodiment, whose features are additional or alternative to any features of the preceding embodiments, the first voltage generation stage comprises a decoupling stage configured to receive the reference voltage and to provide the first supply voltage to a first supply terminal while electrically decoupling the first voltage generation stage and the second driving device to each other; the storage capacitor may be electrically coupled to the first supply terminal.

According to an embodiment, whose features are additional or alternative to any features of the preceding embodiments, the second voltage generation stage comprises a first impedance network configured to receive the first supply voltage and to provide a corresponding further reference current, a second impedance network, e.g., equal to the first impedance network, configured to receive the input voltage and the further reference current and to provide the second supply voltage to a second supply terminal; the switching unit may electrically couple or decouple the second supply terminal to the first supply terminal to allow or prevent, respectively, the flow of the first electric charge into the storage capacitor.

According to an embodiment, whose features are additional or alternative to any features of the preceding embodiments, the first voltage generation stage comprises a reference current generator configured to generate a reference current adjustable according to the output current, and a reference voltage generator configured to generate the reference voltage according to the reference current; the reference voltage generator may comprise a third impedance network; the second voltage generation stage may share the first impedance network with the reference voltage generator of the first voltage generation stage.

According to an embodiment, whose features are additional or alternative to any features of the preceding embodiments, the switching converter is a buck converter, a boost converter or a buck-boost converter.

Another aspect of some embodiments of the present invention relates to a system comprising one or more of such switching converters.

A further aspect of some embodiments of the present invention relate to a method for converting, in a switching converter, a direct current input voltage into a direct current output voltage. The switching converter comprises a switching stage comprising first and second switching devices for receiving the direct current input voltage and for providing the direct current output voltage according to the direct current input voltage, and a driving stage comprising first and second driving devices for driving the first and second switching devices, respectively. The method may comprise sensing an output current provided by the switching stage. The method may comprise generating at least one supply voltage for powering the driving stage; said generating may comprise adjusting the at least one supply voltage according to the output current being sensed. The method may comprise storing a first electric charge being lost from the first driving device during driving of the first switching device and releasing at least partially the stored first electric charge to the second driving device during driving of the second switching device, so as to at least partially compensate for a second electric charge being lost from the second driving device during driving of the second switching device.

BRIEF DESCRIPTION OF THE DRAWINGS

These and other features and advantages of the present invention will be made apparent by the following description of some exemplary and non-limitative embodiments thereof. For its better intelligibility, the following description should be read making reference to the attached drawings, wherein.

DETAILED DESCRIPTION OF ILLUSTRATIVE EMBODIMENTS

Figure 1:
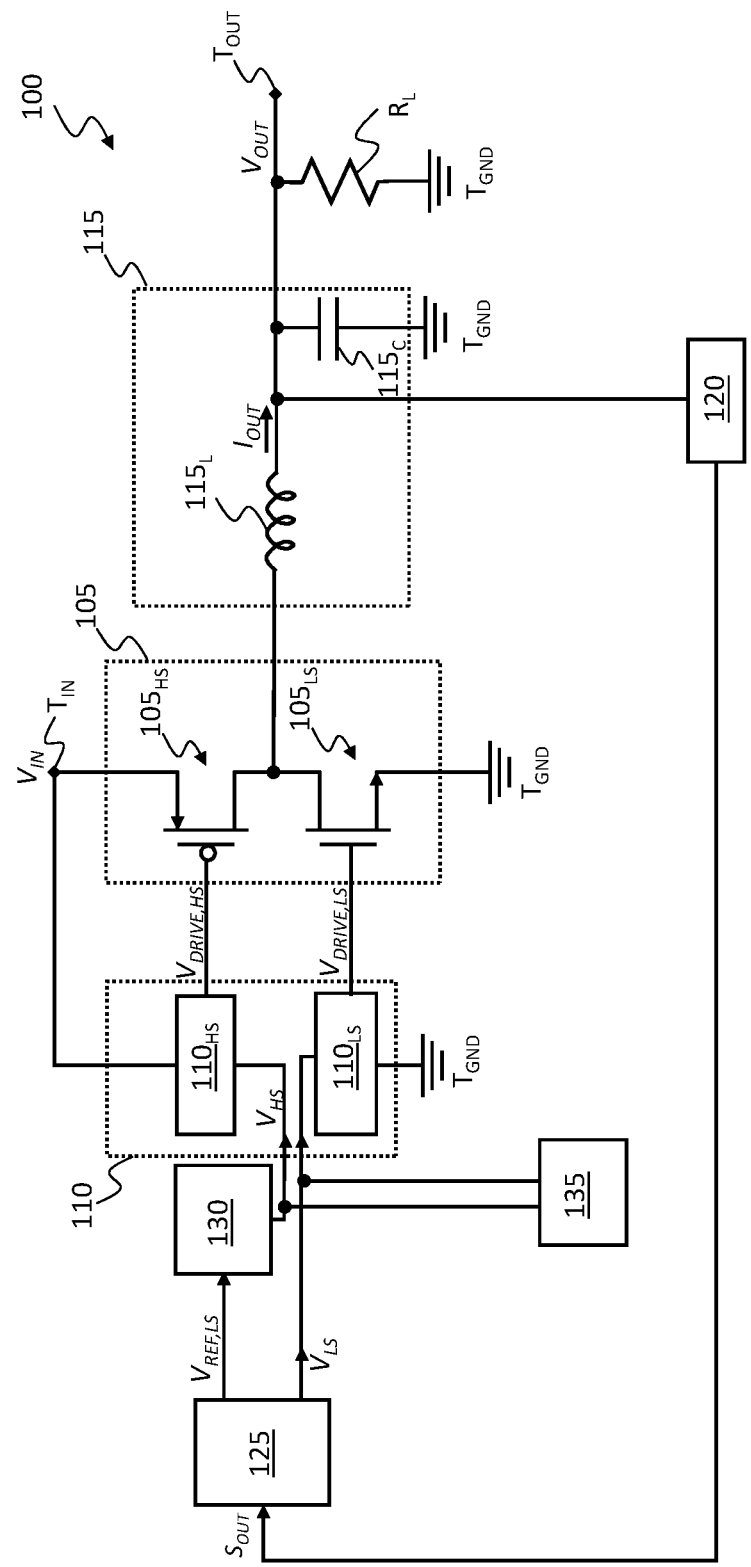
FIG. 1 shows a simplified circuit diagram of a switching converter, according to an embodiment of the present invention.

With reference to the drawings, FIG. 1 shows a circuit diagram of a switching converter 100, according to an embodiment of the present invention.

In the following, when one or more features of the switching converter 100 are introduced by the wording "according to an embodiment," they are to be construed as features additional or alternative to any features previously introduced, unless otherwise indicated and/or unless there is evident incompatibility among feature combinations.

According to an embodiment, the switching converter 100 is a DC-DC switching converter, i.e., a switching converter configured to convert a direct current (DC) input voltage $V_{IN}$ into a direct current (DC) output voltage $V_{OUT}$.

According to an embodiment, the output voltage $V_{OUT}$ is lower than or equal to the input voltage $V_{IN}$, i.e., the switching converter 100 is a step-down converter (or buck converter). However, the principles of some embodiments of the present invention equivalently apply to other switching converters, such as step-up converters (or boost converters), in which the output voltage $V_{OUT}$ is higher than the input voltage $V_{IN}$, or a combination of step-down and step-up converters (or buck-boost converters).

Without losing generality, the switching converter 100 may be used in any electronic system comprising a power source (such as a battery) and one or more electronic/electro-mechanic components each one operating at a respective voltage: in such an electronic system the switching converter 100 (or more thereof) may be configured to generate multiple controlled output voltages from a single input voltage provided by the power source (thus saving space, in that the use of multiple power sources within the electronic system to supply different components thereof is avoided). Examples of such an electronic system include a desktop computer, a server, a laptop computer, a media player (such as an MP3 player), an appliance, a subnotebook/netbook, a tablet computer, a smartphone, a cellular telephone, a network appliance, a personal digital assistant (PDA), a toy, a controller, a digital signal processor, a game console, a device controller, a portable computing device and/or a portable electronic device.

According to an embodiment, the switching converter 100 comprises an input terminal $T_{IN}$ providing the input voltage $V_{IN}$, and an output terminal $T_{OUT}$ providing the output voltage $V_{OUT}$.

According to an embodiment, the switching converter 100 comprises a switching stage 105 for receiving the input voltage $V_{IN}$ and for providing the output voltage $V_{OUT}$ according to the input voltage $V_{IN}$ and to a driving signal driving the switching stage 105 (as discussed in the following).

According to an embodiment, the switching stage 105 comprises a CMOS switching stage.

According to an embodiment, the switching stage 105 comprises a high-side switching device $105_{HS}$ and a low-side switching device $105_{LS}$. In the following, the high-side switching device $105_{HS}$ and the low-side switching device $105_{LS}$ will be also concisely denoted by switching devices $105_{HS}, 105_{LS}$, when distinguishing between the high-side switching device $105_{HS}$ and the low-side switching device $105_{LS}$ is not relevant for the understanding of the present invention.

According to an embodiment, the high-side switching device $105_{HS}$ comprises a PMOS transistor. In the exemplary considered embodiment, the PMOS transistor comprises a source terminal electrically coupled (e.g., directly connected) to the input terminal $T_{IN}$ for receiving the input voltage $V_{IN}$, a gate terminal for receiving a respective driving signal $V_{DRIVE,HS}$ (hereinafter, high-side driving signal), and a drain terminal electrically coupled to the output terminal $T_{OUT}$ of the switching converter 100.

According to an embodiment, the low-side switching device $105_{LS}$ comprises a NMOS transistor According to an embodiment, the NMOS transistor comprises a source terminal electrically coupled (e.g., directly connected) to a ground terminal $T_{GND}$ providing a ground voltage (for example, 0 V), a gate terminal for receiving a respective driving signal $V_{DRIVE,LS}$ (hereinafter, low-side driving signal), and a drain terminal electrically coupled (e.g., directly connected) to the drain terminal of the PMOS transistor $105_{HS}$.

According to an embodiment, the switching converter 100 comprises a driving stage no for driving the switching stage.

In the exemplary considered embodiment, the driving stage no comprises a high-side driving device (hereinafter, high-side driver) $110_{HS}$ (for example, a tapered buffer arrangement) for receiving an oscillating signal (for example, a PWM signal), not shown, and for providing to the high-side switching device $105_{HS}$ (particularly, to the gate terminal of the PMOS transistor) the high-side driving signal $V_{DRIVE,HS}$ (the high-side driving signal $V_{DRIVE,HS}$ being for example a respective regenerated version of the oscillating signal), and a low-side driving device (hereinafter, low-side driver) $110_{LS}$ (for example, a tapered buffer arrangement) for receiving the oscillating signal and for providing to the low-side switching device $105_{LS}$ (particularly, to the gate terminal of the NMOS transistor) the low-side driving signal $V_{DRIVE,LS}$ (the low-side driving signal $V_{DRIVE,L}$ being for example a respective regenerated version of the oscillating signal).

According to an embodiment, the driving stage no is powered by one or more supply voltages.

According to an embodiment, the high-side driver $110_{HS}$ is powered with respective supply voltages. According to an embodiment, the supply voltages powering the high-side driver $110_{HS}$ comprise a high or relatively high supply voltage and a low or relatively low supply voltage $V_{HS}$. According to an embodiment, the high or relatively high supply voltage powering the high-side driver $110_{HS}$ comprises the input voltage $V_{IN}$ (as conceptually illustrated in FIG. 1 the electrical connection between the high-side driver $110_{HS}$ and the input terminal $T_{IN}$).

According to an embodiment, the low-side driver $110_{LS}$ is powered with respective supply voltages. According to an embodiment, the supply voltages powering the low-side driver $110_{LS}$ comprise a high or relatively high supply voltage $V_{LS}$ and a low or relatively low supply voltage. According to an embodiment, the low or relatively low supply voltage powering the low-side driver $110_{LS}$ comprises the ground voltage (as conceptually illustrated in FIG. 1 by the electrical connection between the low-side driver $110_{LS}$ and the ground terminal $T_{GND}$).

In the following, the low or relatively low supply voltage $V_{HS}$ powering the high-side driver $110_{HS}$ and the high or relatively high supply voltage $V_{LS}$ powering the low-side driver $110_{LS}$ will be referred to as high-side supply voltage $V_{HS}$ and low-side supply voltage $V_{LS}$, respectively, the terminal of the high-side driver $110_{HS}$ receiving the high-side supply voltage $V_{HS}$ will be referred to as high-side supply terminal, and the terminal of the low-side driver $110_{LS}$ receiving the low-side supply voltage $V_{LS}$ will be referred to as low-side supply terminal.

According to an embodiment, the high-side driver $110_{HS}$ and the low-side driver $110_L$ have a same supply voltage drop $V_{CC}$ between the respective supply voltages. In the considered example:

$$V_{CC} = V_{IN} - V_{HS}$$

$$V_{CC} = V_{LS}$$

According to an embodiment, the switching converter 100 comprises a filtering stage 115 electrically coupled to the switching stage 105. According to an embodiment, the filtering stage 115 is electrically coupled to the drain terminal of the PMOS transistor (and, hence, to the drain terminal of the NMOS transistor).

According to an embodiment, the filtering stage 115 comprises a LC filtering stage.

According to an embodiment, the filtering stage 115 comprises an inductor element $115_L$ (or more thereof) having a first terminal electrically coupled (e.g., directly connected) to the drain terminal of the PMOS transistor (and, hence, to the drain terminal of the NMOS transistor) and a second terminal electrically coupled (e.g., directly connected) to the output terminal $T_{OUT}$ of the switching converter 100, and a capacitor element $115_C$ (or more thereof) having a first terminal electrically coupled (e.g., directly connected) to the first terminal of the inductor element $115_L$ (and, hence, to the output terminal $T_{OUT}$ of the switching converter 100) and a second terminal electrically coupled (e.g., directly connected) to the ground terminal $T_{GND}$.

Therefore, in the considered embodiment, the switching stage 105 is electrically coupled to the output terminal $T_{OUT}$ of the switching converter 100 through the filtering stage 115.

According to an embodiment, each driving signal $V_{DRIVE,HS}$, $V_{DRIVE,LS}$ is a digital signal, i.e., a signal that may take a low logic level and a high logic level. Just as a numerical example, the low and high logic levels of the low-side driving signal $V_{DRIVE,LS}$ may respectively correspond to a reference or ground voltage (such as 0 V) and to a positive voltage higher than the ground voltage (such as 3.4 V), whereas the low and high logic levels of the high-side driving signal $V_{DRIVE,HS}$ may respectively correspond to the high-side supply voltage $V_{HS}$ and to a positive voltage higher than the high-side supply voltage $V_{HS}$ by 3.4 V.

According to an embodiment, as mentioned above, each driving signal $V_{DRIVE,HS}$, $V_{DRIVE,LS}$ is provided (e.g., generated) from an oscillating signal (e.g., a PWM signal), not shown.

According to an embodiment, the oscillating signal is a square-wave signal with duty cycle d. According to an embodiment, the duty cycle d of the oscillating signal is dynamically variable so as to accordingly vary a conversion factor ($V_{OUT}/V_{IN}$) of the switching converter 100.

According to an embodiment, depending on the value of the respective driving signal $V_{DRIVE,HS}$, $V_{DRIVE,LS}$, each switching device $105_H$, $105_L$ may take a closed or ON state in which an electric current is allowed to flow across it, and an open or OFF state in which no electric current is allowed to flow across it.

As mentioned above, the switching converter 100 may be used in any electronic system. According to an embodiment, the switching converter 100 is configured to be electrically coupled to one or more modules of such an electronic system. Such modules are conceptually represented in FIG. 1 by an equivalent resistor element $R_L$, hereinafter referred to as load resistor, having a first terminal electrically coupled (e.g., directly connected) to the output terminal $T_{OUT}$ of the switching converter 100 and a second terminal electrically coupled (e.g., directly connected) to the ground terminal $T_{GND}$.

According to an embodiment, the switching converter 100 comprises a sensing arrangement 120 configured to sense an electric current output by the switching stage 105 (hereinafter, concisely, output current $I_{OUT}$). In some embodiments, the current sensing arrangement 120 may be implemented in any way known in the art.

The switching converter so far disclosed may be regarded as a typical, known switching converter.

The switching converter 100 according to some embodiments of the present invention is aimed at optimizing power losses by making the high-side supply voltage $V_{HS}$ and the low-side supply voltage $V_{LS}$ variable according to the output current $I_{OUT}$, and by implementing a charge recovery mechanism in which an electric charge being lost from the high-side driving driver is at least partially recovered to at least partially compensate for an electric charge being lost from the low-side driver.

The principles underlying the idea of making the high-side supply voltage $V_{HS}$ and the low-side supply voltage $V_{LS}$ variable according to the output current $I_{OUT}$ are summarized here below.

Let be assumed that the power losses $P_{loss}$ of the switching converter 100 may be regarded as mainly determined by conduction losses $P_{Joule}$ and driving losses $P_{Driving}$ (i.e., let be assumed that switching losses, dynamic losses, parasitic coil losses and bias losses may be disregarded):

$$P_{loss} = P_{Joule} + P_{Driving}$$

$$P_{Joule} = [d * R_{switch} + (1-d) * R_{switch}] * I_{OUT}^2 == R_{switch} * I_{OUT}^2$$

$$P_{Driving} = C_g * V_{CC} * V_{IN} * f_{sw}$$

wherein:
d represents the duty cycle;
$R_{switch}$ represents the resistance exhibited by the high-side switching device $105_{HS}$ in the ON state and by the low-side switching device $105_{LS}$ in the ON state;
$I_{OUT}$ represents the output current;
$C_g$ represents an equivalent capacitance exhibited at control terminals of the high-side $105_H$ and low-side $105_L$ switching devices (e.g., at the gate terminals of the respective transistors);
$V_{CC}$ represents the supply voltage drop across the high-side driver $110_{HS}$ and across the low-side driver $110_{LS}$;
$f_{sw}$ represents a switching frequency of the switching converter no.

Denoting by $P_{OUT}$ the output power of the switching converter 100, the efficiency $\eta$ of the switching converter 100 may therefore be expressed as:

$$\eta = \frac{P_{out}}{P_{out} + P_{loss}} = \frac{V_{OUT} * I_{OUT}}{V_{OUT} * I_{OUT} + R_{switch} * I_{OUT}^2 + C_g * V_{CC} * V_{IN} * f_{sw}} =$$

-continued $$\frac{1}{1 + \frac{R_{switch} * I_{OUT}}{V_{OUT}} + \frac{C_g * V_{CC} * V_{IN} * f_{sw}}{V_{OUT} * I_{OUT}}}$$

Denoting by $\eta_D$ the reciprocal of the efficiency $\eta$, a maximum of the efficiency $\eta$ as a function of the output current $I_{OUT}$ may be determined as:

$$\frac{d\eta_D}{dI_{OUT}} = \frac{d\left(1 + \frac{R_{switch} * I_{OUT}}{V_{OUT}} + \frac{C_g * V_{CC} * V_{IN} * f_{sw}}{V_{OUT} * I_{OUT}}\right)}{dI_{OUT}} =$$

$$\frac{R_{switch}}{V_{OUT}} - \frac{C_g * V_{CC} * V_{IN} * f_{sw}}{V_{OUT} * I_{OUT}^2} = 0$$

and the output current $I_{OUT}$ corresponding to the maximum of the efficiency $\eta$ is:

$$I_{OUT} = \sqrt{\frac{C_g * V_{CC} * V_{IN} * f_{sw}}{R_{switch}}}$$

Therefore, the maximum of the efficiency $\eta$ is obtained when:

$$P_{Joule} = P_{Driving} = C_g * V_{CC} * V_{IN} * f_{sw}$$

In the considered example in which the switching devices $105_{HS}, 105_{LS}$ comprise MOS transistors, the conduction losses $P_{Joule}$ may be expressed as:

$$P_{Joule} = R_{switch} * I_{OUT}^2 = \frac{1}{k*(V_{CC} - V_T)} * I_{OUT}^2 \simeq \frac{1}{k*V_{CC}} * I_{OUT}^2$$

wherein $k$ $V_T$ is the threshold voltage of the MOS transistors.

Minimization of power loss $P_{loss}$ as a function of the supply voltage drop $V_{CC}$ can be obtained as:

$$\frac{dP_{loss}}{dV_{cc}} = \frac{d(P_{Joule} + P_{Driving})}{dV_{cc}} = 0$$

$$\frac{dP_{loss}}{dV_{cc}} = -\frac{I_{OUT}^2}{k*V_{cc}^2} + C_g * V_{IN} * f_{sw} = 0$$

$$V_{cc} = I_{OUT} * \sqrt{\frac{1}{k*C_g*V_{IN}*f_{sw}}} = Z_{eq} * I_{OUT}$$

According to the principles of some embodiments of the present invention, the switching converter 100 comprises a voltage generation arrangement configured to generate and to adjust the high-side supply voltage $V_{HS}$ and the low-side supply voltage $V_{LS}$ according to the output current $I_{OUT}$ (e.g., an indication thereof) as sensed by the sensing arrangement 120. According to an embodiment, the indication of the output current $I_{OUT}$ is fed to the voltage generation arrangement in the form of a corresponding control signal $S_{OUT}$ (as better discussed in the following, the control signal $S_{OUT}$ may be configured to control one or more controllable elements of the voltage arrangement).

According to an embodiment, as illustrated, the voltage generation arrangement comprises a voltage generation stage (hereinafter, low-side voltage generation stage) 125 configured to generate the low-side supply voltage $V_{LS}$ according to the control signal San', and a voltage generation stage (hereinafter, high-side voltage generation stage) 130 configured to generate the high-side supply voltage $V_{HS}$ according to a reference voltage $V_{REF,LS}$ corresponding to the low-side supply voltage $V_{LS}$ (as better understood from the following discussion).

According to principles of some embodiments of the present invention, the switching converter 100 comprises a charge recovery stage 135. As better discussed in the following, the charge recovery stage 135 is particularly, although not exclusively, advantageous in an optimized implementation of the switching converter 100 (particularly, in an optimized implementation of the low-side voltage generation stage 125 and of the high-side voltage generation stage 130).

Broadly speaking, the charge recovery stage 135 allows storing an electric charge being lost from the high-side driver $110_{HS}$ during driving of the high-side switching device $105_{HS}$ and to release at least partially the stored high-side charge loss to the low-side driver $110_{LS}$ during driving of the low-side switching device $105_{LS}$.

Figure 2:
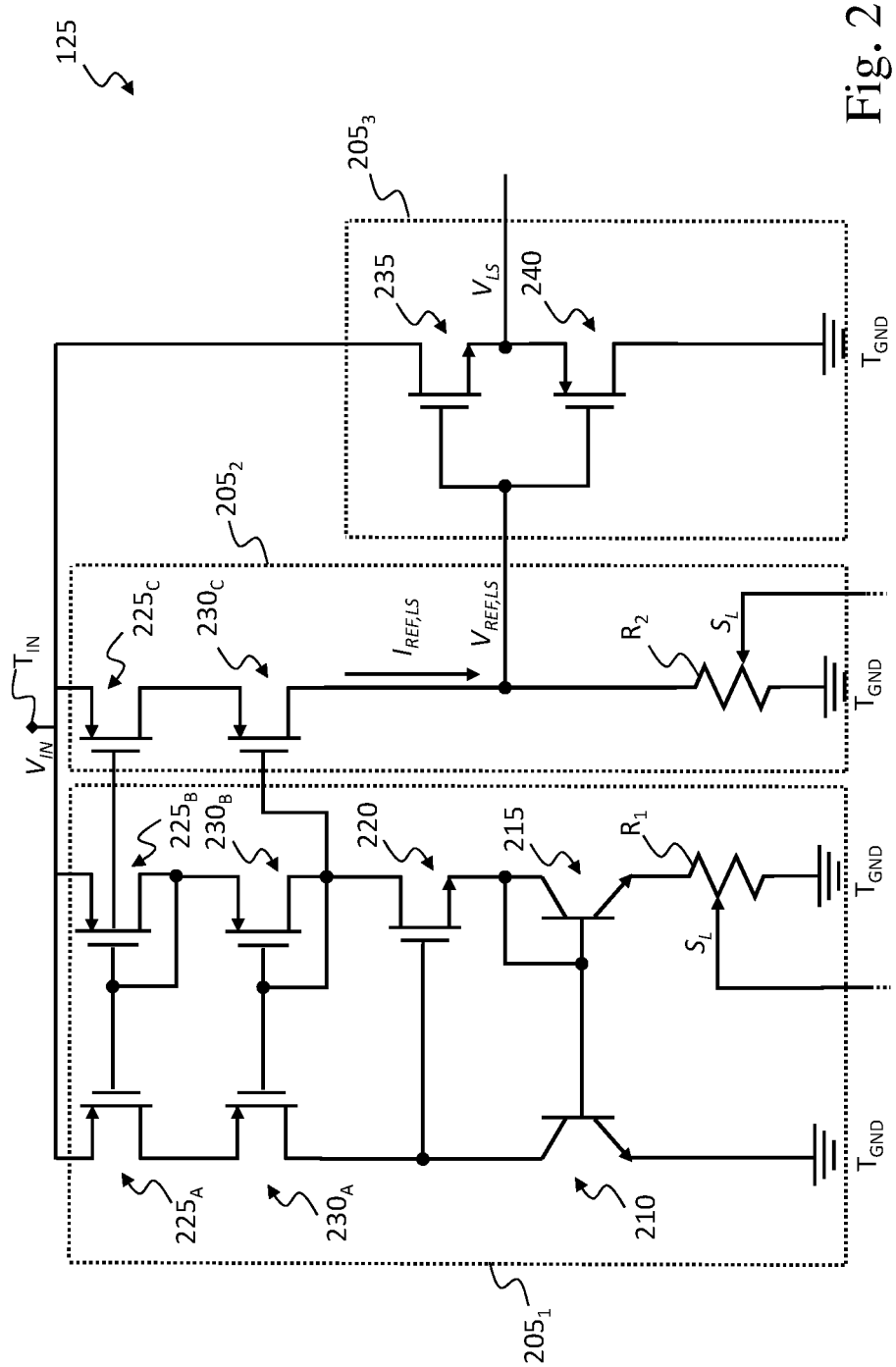
FIG. 2 shows a circuit implementation of a voltage generation stage of the switching converter, according to an embodiment of the present invention.

With reference now to FIG. 2, it shows a circuit implementation of the low-side voltage generation stage 125 according to an embodiment of the present invention.

According to an embodiment, the low-side voltage generation stage 125 comprises a reference current generator $205_1$ configured to generate a reference current $I_{REF,LS}$.

According to an embodiment, the reference current generator $205_1$ comprises a current mirror—based current generator.

According to an embodiment, the current mirror—based current generator comprises a first generation transistor 210 (e.g., a BJT transistor) having an emitter terminal electrically coupled (e.g., directly connected) to the reference terminal $T_{GND}$, a second generation transistor 215 (e.g., a BJT transistor) having a base terminal electrically coupled (e.g., directly connected) to the base terminal of the first generation transistor 210 and a collector terminal electrically coupled (e.g., directly connected) to the respective base terminal (the second generation transistor 215 being thus in diode-connected configuration), a third generation transistor 220 (e.g., a NMOS transistor) having a source terminal electrically coupled (e.g., directly connected) to the collector terminal of the second generation transistor 215 and a gate terminal electrically coupled (e.g., directly connected) to the collector terminal of the first generation transistor 210, and an impedance network $R_1$ electrically coupled between the emitter terminal of the second generation transistor 215 and the ground terminal $T_{GND}$.

The impedance network $R_1$ is conceptually represented in FIG. 2 as a single resistor, although this should not be construed as a limitation.

According to an embodiment, the impedance network $R_1$ comprises a resistive network.

According to an embodiment, the impedance network $R_1$ is electrically coupled (e.g., directly connected) between the emitter terminal of the second generation transistor 215 and the ground terminal $T_{GND}$.

According to well-known principles of the current mirror—based current generators, the reference current $I_{REF,LS}$ flowing through the generation transistors 210,215,220 may be expressed as:

$$I_{REF,LS} = \frac{V_{th} * \ln(m)}{R_1}$$

wherein $V_{th}$ is the thermal voltage (approximately 26 mV at 300 K room temperature);

m represents a size ratio between the second generation transistor 215 and the first generation transistor 210;

$R_1$ denotes an impedance value of the impedance network $R_1$.

According to an embodiment, the current mirror—based current generator comprises a number of (e.g., two) first mirroring transistors between the input terminal $T_{IN}$ and the first generation transistor 210, and a same number of (e.g., two) second mirroring transistors between the input terminal $T_{IN}$ and the third generation transistor 220, the first and second mirroring transistors being arranged in current mirror configuration.

According to an embodiment, the first mirroring transistors comprise a mirroring transistor 225A (e.g., a PMOS transistor) having a source terminal electrically coupled (e.g., directly connected) to the input terminal $T_{IN}$, and a mirroring transistor 230$_A$ (e.g., a PMOS transistor) having a source terminal electrically coupled (e.g., directly connected) to a drain terminal of the mirroring transistor 225A, and a drain terminal electrically coupled (e.g., directly connected) to the gate terminal of the third generation transistor 220 (and, hence, to the collector terminal of the first generation transistor 210).

According to an embodiment, the second mirroring transistors comprise a mirroring transistor 225B (e.g., a PMOS transistor) having a source terminal electrically coupled (e.g., directly connected) to the input terminal $T_{IN}$, a gate terminal electrically coupled (e.g., directly connected) to the gate terminal of the mirroring transistor 225A, and a drain terminal electrically coupled (e.g., directly connected) to the respective gate terminal (the mirroring transistor 225B being thus in diode-connected configuration), and a mirroring transistor 230$_B$ (e.g., a PMOS transistor) having a source terminal electrically coupled (e.g., directly connected) to the drain terminal of the mirroring transistor 225B, a gate terminal electrically coupled (e.g., directly connected) to the gate terminal of the mirroring transistor 230$_A$, and a drain terminal electrically coupled (e.g., directly connected) to the respective gate terminal (the mirroring transistor 225B being thus in diode-connected configuration) and to the drain terminal of the third generation transistor 220.

According to an embodiment, the low-side voltage generation stage 125 comprises a reference voltage generator 205$_2$ configured to generate the reference voltage $V_{REF,LS}$ according to the reference current $I_{REF,LS}$.

According to an embodiment, the reference voltage generator 205$_2$ comprises an impedance network $R_2$ (conceptually represented in FIG. 2 as a single resistor, although this should not be construed as a limitation).

According to an embodiment, the impedance network $R_2$ comprises a resistive network.

According to an embodiment, the impedance network $R_2$ is configured to be flown through by the reference current $I_{REF,LS}$, whereby the reference voltage $V_{REF,LS}$ depends on the reference current $I_{REF,LS}$ and an impedance value $R_2$ of the impedance network $R_2$.

According to an embodiment, the reference voltage generator 205$_2$ comprises a number of (e.g., two) mirroring transistors (hereinafter, third mirroring transistors) electrically coupled to the first and second mirroring transistors of the reference current generator 205$_1$ so as to receive the reference current $I_{REF,LS}$ therefrom. In other words, the first, second and third mirroring transistors implement, as a whole, a current mirror arrangement. According to an embodiment, the first, second and third mirroring transistors are designed such that the same reference current $I_{REF,LS}$ is allowed to flow through first, second and third circuit branches identified by the first, second and third mirroring transistors, respectively.

According to an embodiment, the third mirroring transistors comprise a mirroring transistor 225$_C$ (e.g., a PMOS transistor) having a source terminal electrically coupled (e.g., directly connected) to the input terminal $T_{IN}$, a gate terminal electrically coupled (e.g., directly connected) to the gate terminals of the mirroring transistors 225A,225B, and a mirroring transistor 230$_C$ (e.g., a PMOS transistor) having a source terminal electrically coupled (e.g., directly connected) to a drain terminal of the mirroring transistor 225$_C$, a gate terminal electrically coupled (e.g., directly connected) to the gate terminals of the mirroring transistors 230$_A$,230$_B$, and a drain terminal electrically coupled (e.g., directly connected) to a first terminal of the impedance network $R_2$.

According to an embodiment, a second terminal of the impedance network $R_2$ is electrically coupled (e.g., directly connected) to the ground terminal $T_{GND}$, whereby the reference voltage $V_{REF,LS}$ across the impedance network $R_2$ may be expressed as:

$$V_{REF,LS} = I_{REF,LS} * R_2 = \frac{V_{th} * \ln(m)}{R_1} * R_2$$

wherein $R_2$ denotes an impedance value of the impedance network $R_2$.

According to an embodiment, at least one between the reference current $I_{REF,LS}$ and the reference voltage $V_{REF,LS}$ is adjustable (variable) according to the output current $I_{OUT}$.

As conceptually represented in FIG. 2, according to an embodiment, the impedance network $R_1$ may be a variable impedance network whose impedance value $R_1$ is controlled according to the control signal $S_{OUT}$ (and, hence, according to the output current $I_{OUT}$). Therefore, in this embodiment, in order to obtain a low-side supply voltage $V_{LS}$ that is variable according to the output current $I_{OUT}$, the reference current $I_{REF,LS}$ generated by the reference current generator 205$_1$ is variable according to the output current $I_{OUT}$. In this embodiment, the impedance network $R_2$ may instead be a conventional impedance network whose impedance value $R_2$ is fixed.

As conceptually represented in FIG. 2, according to an embodiment, the impedance network $R_2$ may be a variable impedance network whose impedance value $R_2$ is controlled according to the control signal $S_{OUT}$ (and, hence, according to the output current $I_{OUT}$). In this embodiment, the impedance network $R_1$ may instead be a conventional impedance network whose impedance value $R_1$ is fixed. Therefore, in this embodiment, in order to obtain a low-side supply voltage $V_{LS}$ that is variable according to the output current $I_{OUT}$, the reference current $I_{REF,LS}$ generated by the reference current generator $205_1$ is fixed, whereas the reference voltage $V_{REF,LS}$ generated by the reference voltage generator $205_1$ is variable according to the output current $I_{OUT}$.

Therefore, regardless of the fact that the electrical amount that is adjustable according to the output current $I_{OUT}$ is the reference current $I_{REF,LS}$ or the reference voltage $V_{REF,LS}$, in any case the impedance network $R_1$ and/or the impedance network $R_2$ may be changed (according to the control signal $S_{OUT}$) so that the reference voltage $V_{REF,LS}$ (and, hence, the low-side supply voltage $V_{LS}$) is equal to the amount $Z_{eq}*I_{OUT}$ that minimizes the power loss $P_{loss}$ of the switching converter 100.

Without losing generality, embodiments in which the impedance network $R_1$ is a variable impedance network and the impedance network $R_2$ is a fixed impedance network are particularly advantageous. Indeed, in practical (and optimized) implementations, in order to obtain a decrease in the low-side supply voltage $V_{LS}$ in response to a decrease in the output current $I_{OUT}$, modulating the reference current $I_{REF,LS}$ (thanks to the variable impedance network $R_1$) allows reducing power consumption (on the contrary, modulating the reference voltage $V_{REF,LS}$ through the variable impedance network $R_2$ would involve higher power consumption through the third circuit branch identified by third mirroring transistors $225_C,230_C$).

Moreover, in practical (and optimized) implementations, the impedance network $R_2$ may be used to generate the high-side supply voltage $V_{HS}$, whereby the impedance network $R_2$ may be shared by the low-side and high-side voltage generation stages (as better discussed in the following).

According to an embodiment, the low-side voltage generation stage 125 comprises an output stage $205_3$ configured to provide the low-side supply voltage $V_{LS}$ according to the reference voltage $V_{REF,LS}$.

According to an embodiment, the low-side supply voltage $V_{LS}$ provided by the output stage $205_3$ corresponds to the reference voltage $V_{REF,LS}$.

According to an embodiment, the low-side supply voltage $V_{LS}$ provided by the output stage $205_3$ is equal to the reference voltage $V_{REF,LS}$.

According to an embodiment, the output stage $205_3$ is configured to provide the reference voltage $V_{REF,LS}$ without power absorption from the third circuit branch identified by the third mirroring transistors $225_C,230_C$. Therefore, in this embodiment, the output stage $205_3$ acts as a decoupling stage for decoupling the low-side voltage generation stage 125 and the low-side driver $110_{LS}$ to each other.

According to an embodiment, the output stage $205_3$ comprises an output transistor 235 (e.g., a NMOS transistor) having a drain terminal electrically coupled (e.g., directly connected) to the input terminal $T_{IN}$, a gate terminal electrically coupled (e.g., directly connected) to the first terminal of the impedance network $R_2$ so as to receive the reference voltage $V_{REF,LS}$, and a source terminal electrically coupled to the low-side driver $110_{LS}$ (i.e., to the low-side supply terminal), and an output transistor 240 (e.g., a PMOS transistor) having a source terminal electrically coupled (e.g., directly connected) to the source terminal of the output transistor 235 (and, hence, to the low-side supply terminal), a gate terminal electrically coupled (e.g., directly connected) to the gate terminal of the output transistor 235, and a drain terminal electrically coupled (e.g., directly connected) to the ground terminal $T_{GND}$.

In other words, the output transistors 235,240 implement a push-pull configuration in which the reference voltage $V_{REF,LS}$ is transferred unchanged from the gate terminals of the output transistors 235,240 to the source terminals of the output transistors 235,240 (and, hence, to the low-side driver $110_{LS}$). Particularly, when the reference voltage $V_{REF,LS}$ equals the low-side supply voltage $V_{LS}$, the output stage $205_3$ is in an equilibrium condition in which the output transistors 235,240 are both in the OFF state; an increase or decrease of the reference voltage $V_{REF,LS}$ from the equilibrium condition determines the output transistor 235 or the output transistor 240, respectively, to switch into the ON state until the low-side supply voltage $V_{LS}$ at the respective source terminal has reached the reference voltage $V_{REF,LS}$.

Figure 3:
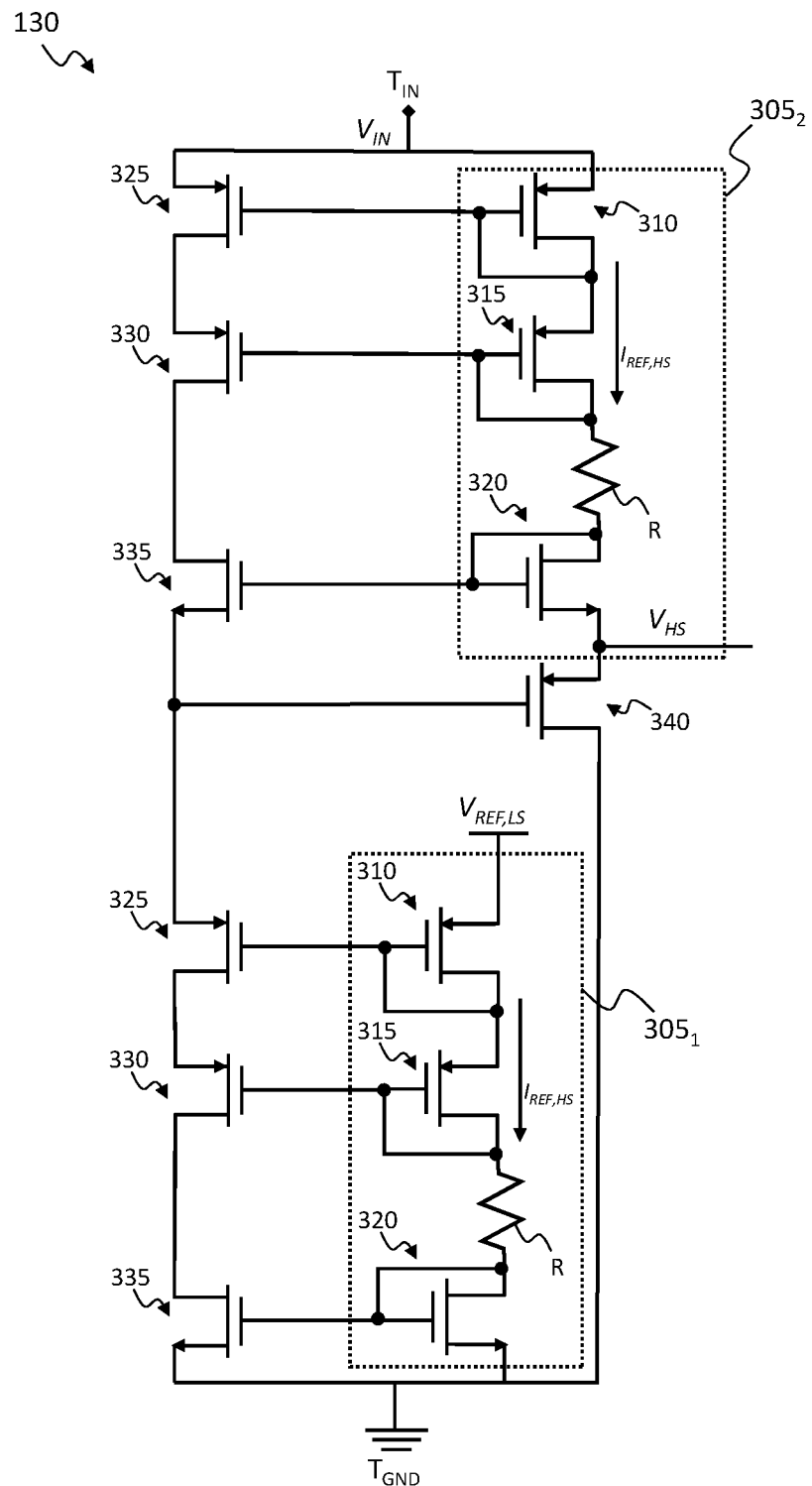
FIG. 3 shows a circuit implementation of a voltage generation stage of the switching converter, according to an embodiment of the present invention.

With reference now to FIG. 3, it shows a circuit implementation of the high-side voltage generation stage 130 according to an embodiment of the present invention.

According to an embodiment, the high-side voltage generation stage 130 comprises a reference current generator $305_1$ configured to generate a reference current $I_{REF,HS}$.

According to an embodiment, as illustrated, the reference current generator $305_1$ is configured to generate the reference current $I_{REF,HS}$ based on the reference voltage $V_{REF,LS}$ determined at the low-side voltage generation stage 125.

According to an embodiment, the reference current generator $305_1$ comprises an impedance network electrically coupled between a terminal providing the reference voltage $V_{REF,LS}$ and the ground terminal $T_{GND}$.

According to an embodiment, the impedance network comprises a number of (e.g., three) transistors (hereinafter, dividing transistors), for example MOS transistors, in diode-connected configuration.

According to an embodiment, the impedance network comprises a first dividing transistor 310 (e.g., a PMOS transistor) having a source terminal receiving the reference voltage $V_{REF,LS}$, and gate and drain terminals electrically coupled (e.g., directly connected) to each other, a second dividing transistor 315 (e.g., a PMOS transistor) having a source terminal electrically coupled (e.g., directly connected) to the drain terminal of the first dividing transistor 310, and gate and drain terminals electrically coupled (e.g., directly connected) to each other, and a third dividing transistor 320 (e.g., a NMOS transistor) having a drain terminal electrically coupled to the drain terminal of the second dividing transistor 315, a gate terminal electrically coupled (e.g., directly connected) to the respective drain terminal, and a source terminal electrically coupled (e.g., directly connected) to the ground terminal $T_{GND}$.

According to an embodiment, the impedance network comprises a dividing resistor R (or more thereof, in alternative embodiments of the present invention). According to an embodiment, the drain terminal of the third dividing transistor 320 is electrically coupled to the drain terminal of the second dividing transistor 315 by interposition of the dividing resistor R. According to an embodiment, the dividing resistor R comprises a first terminal electrically coupled (e.g., directly connected) to the drain terminal of the dividing transistor 315 and a second terminal electrically coupled (e.g., directly connected) to the drain terminal of the dividing transistor 320.

According to well-known principles of voltage dividers, the reference voltage $V_{REF,LS}$ is divided across the drain terminals of the dividing transistors based on an equivalent impedance between each drain terminal and the ground terminal $T_{GND}$. The reference current $I_{REF,HS}$ flowing through the impedance network may therefore be expressed as the ratio between the voltages at the drain terminals of the second 315 and third 320 dividing transistors and a resistance value of the dividing resistor R.

According to an embodiment, the high-side voltage generation stage 130 comprises a high-side supply voltage generator $305_2$ configured to receive the reference current $I_{REF,HS}$ and the input voltage $V_{IN}$ and to generate the high-side supply voltage $V_{HS}$ according thereto.

According to an embodiment, the high-side supply voltage generator $305_2$ is based on an impedance network. According to an embodiment, the impedance network of the high-side supply voltage generator $305_2$ is equal to the impedance network of the reference current generator $305_1$. In other words, the impedance network of the high-side supply voltage generator $305_2$ has same implementation as the impedance network of the reference current generator $305_1$ (i.e., it comprises the first 310, second, 315 and third 320 dividing transistors and the dividing resistor R) and same sizing (i.e., with the dividing transistors 310,315,320 and the dividing resistor R of the high-side supply voltage generator $305_2$ that dimensionally match the dividing transistors 310,315,320 and the dividing resistor R of the reference current generator $305_1$, respectively).

According to an embodiment, the source terminal of the first dividing transistor 310 of the high-side supply voltage generator $305_2$ is electrically coupled (e.g., directly connected) to the input terminal $T_{IN}$ (for receiving the input voltage $V_{IN}$), and the source terminal of the third dividing transistor 320 of the high-side supply voltage generator $305_2$ is electrically coupled (e.g., directly connected) to the high-side supply terminal (for providing the high-side supply voltage $V_{HS}$). Therefore, upon reception of the reference current $I_{REF,HS}$ from the reference current generator $305_1$, a same voltage drop (equal to the reference voltage $V_{REF,LS}$) is experienced across the impedance network of the reference current generator $305_1$ and across the impedance network of the high-side supply voltage generator $305_2$, and a high-side supply voltage $V_{HS}$ equal to:

$$V_{HS} = V_{IN} - V_{REF,LS}$$

is generated at the source terminal of the third dividing transistor 320 of the high-side supply voltage generator $305_2$.

In the example at issue in which $V_{REF,LS}=V_{LS}$, the high-side supply voltage $V_{HS}$ generated at the source terminal of the third dividing transistor 320 of the high-side supply voltage generator $305_2$ is equal to:

$$V_{HS} = V_{IN} - V_{LS}$$

According to an embodiment, each one of the reference current generator $305_1$ and the high-side supply voltage generator $305_2$ comprises a respective current mirror arrangement for providing the reference current $I_{REF,HS}$ from the impedance network of the reference current generator $305_1$ to the impedance network of the high-side supply voltage generator $305_2$.

According to an embodiment, each current mirror arrangement comprises a first mirroring transistor 325 (e.g., a PMOS transistor) having gate terminal electrically coupled (e.g., directly connected) to the gate terminal of the first dividing transistor 310 of the respective impedance network, a second mirroring transistor 330 (e.g., a PMOS transistor) having a source terminal electrically coupled (e.g., directly connected) to a drain terminal of the first mirroring transistor 325 and a gate terminal electrically coupled (e.g., directly connected) to the gate terminal of the second dividing transistor 315 of the respective impedance network, and a third mirroring transistor 335 (e.g., a NMOS transistor) having a drain terminal electrically coupled (e.g., directly connected) to the drain terminal of the second mirroring transistor 330 and a gate terminal electrically coupled (e.g., directly connected) to the gate terminal of the third dividing transistor 320 of the respective impedance network.

According to an embodiment, the current mirror arrangement of the reference current generator $305_1$ and the current mirror arrangement of the high-side supply voltage generator $305_2$ are electrically coupled to each other between the input terminal $T_{IN}$ and the ground terminal $T_{GND}$. In order to achieve it, according to an embodiment, a source terminal of the first mirroring transistor 325 of the reference current generator $305_1$ is electrically coupled (e.g., directly connected) to a source terminal of the third mirroring transistor 335 of the high-side supply voltage generator $305_2$, a source terminal of the first mirroring transistor 325 of the high-side supply voltage generator $305_2$ is electrically coupled (e.g., directly connected) to the input terminal $T_{IN}$, and a source terminal of the third mirroring transistor 335 of the reference current generator $305_1$ is electrically coupled (e.g., directly connected) to the ground terminal $T_{GND}$. In this way, the reference current $I_{REF,HS}$ from the impedance network of the reference current generator $305_1$ is mirrored to the respective current mirror arrangement, then it is caused to flow to the current mirror arrangement of the high-side supply voltage generator $305_2$, and hence it is mirrored to the respective the impedance network.

According to an embodiment, the high-side voltage generation stage 130 comprises a clamping device for absorbing current peaks (or, equivalently, electric charge losses) from high-side driver $110_{HS}$. According to an embodiment, the clamping device comprises a clamping transistor 340 electrically coupled between the high-side supply voltage generator $305_2$ and the ground terminal $T_{GND}$. According to an embodiment, the clamping transistor 340 comprises a PMOS transistor having a source terminal electrically coupled (e.g., directly connected) to the source terminal of the third dividing transistor 320 of the high-side supply voltage generator $305_2$ (and, hence, to the high-side supply terminal), a gate terminal electrically coupled (e.g., directly connected) to the source terminal of the third mirroring transistor 335 of the high-side supply voltage generator $305_2$, and a drain terminal electrically coupled (e.g., directly connected) to the ground terminal $T_{GND}$.

According to an embodiment, as mentioned above, the impedance network $R_2$ of the reference voltage generator $205_2$ of the low-side voltage generation stage 125 is equal to the impedance network of the reference current generator $305_1$ of the high-side voltage generation stage 130.

According to an embodiment, the high-side voltage generation stage 130 shares the impedance network of the reference current generator $305_1$ with the reference voltage generator $205_2$ of the low-side voltage generation stage 125, thus the impedance network $R_2$ of the reference voltage generator $205_2$ of the low-side voltage generation stage 125 acts also as the impedance network of the reference current generator $305_1$ of the high-side voltage generation stage 130 (as should be understood, conveniently, in this embodiment the impedance network $R_2$ is a fixed impedance network and the impedance network $R_1$ is a variable impedance network). This embodiment represents a practical and optimized implementation that allows obtaining a switching converter having power loss optimization with substantially no or negligible additional area occupation.

Figure 4:
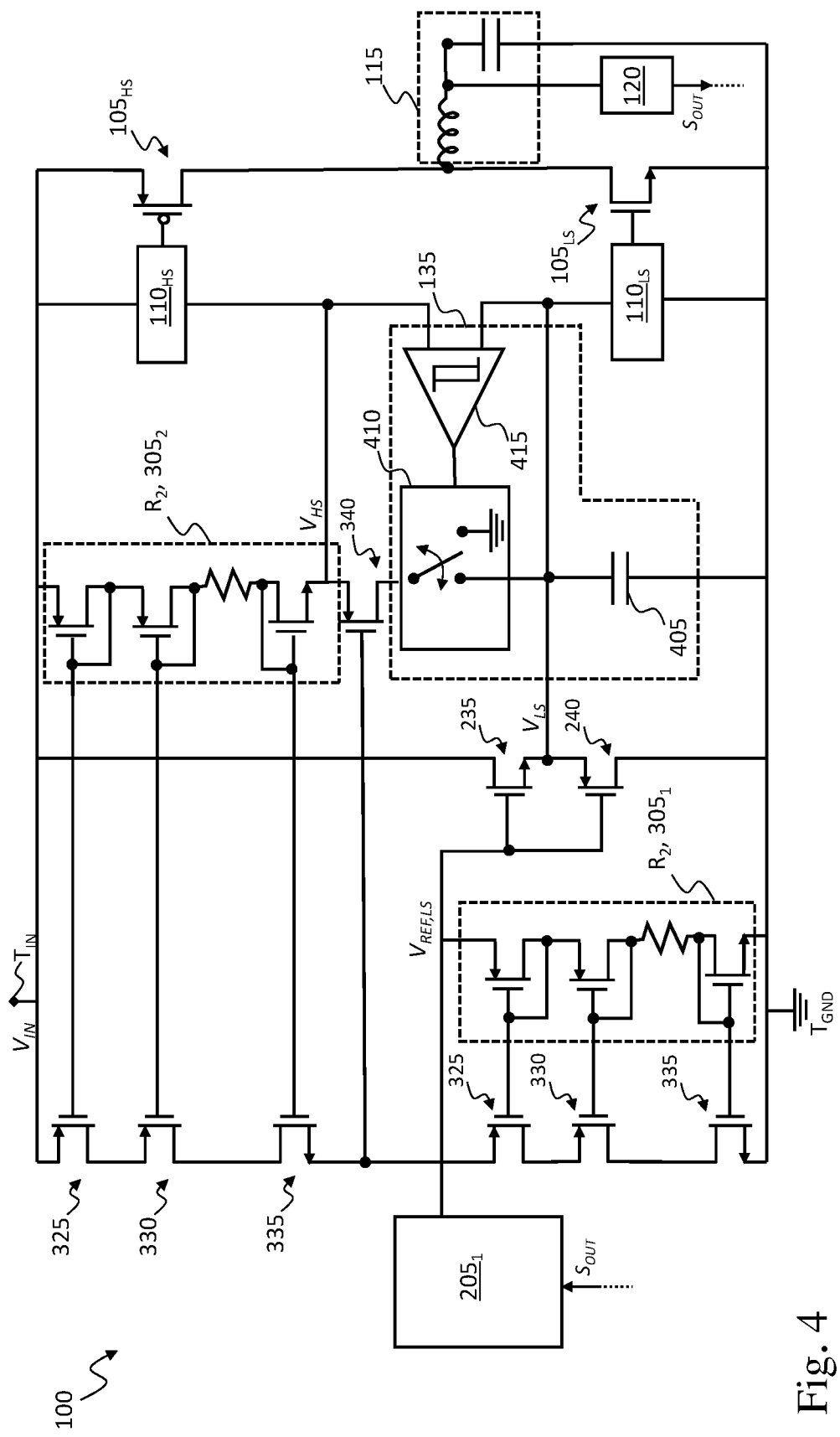
FIG. 4 shows a circuit implementation of the switching converter, according to an embodiment of the present invention.

A circuit diagram of the switching converter 100 featuring such an optimized implementation is shown in FIG. 4. FIG. 4 also shows a basic circuit diagram of the charge recovery stage 135 aimed at providing a recovery of the electric charges resulting from the driving of the high-side switching device $105_{HS}$ (as better discussed here below). As should be understood from the following discussion, although the charge recovery stage 135 is exemplary illustrated in the context of the optimized implementation of the low-side 125 and high-side 130 voltage generation stages, the charge recovery stage 135 may be equivalently applied irrespective of the specific circuit implementation of the low-side 125 and high-side 130 voltage generation stages.

According to the principles of some embodiments of the present invention, the charge recovery stage 135 is configured to store an electric charge being lost from the high-side driver $110_{HS}$ during driving of the high-side switching device $105_{HS}$ (hereinafter, high-side charge loss) and to release at least partially the stored high-side charge loss to the low-side driver $110_{LS}$ during driving of the low-side switching device $105_{LS}$, so as to at least partially compensate for an electric charge being lost from the low-side driver $110_{LS}$ during driving of the low-side switching device $105_{LS}$.

The high-side charge loss may be regarded as an electric charge flowing from the input terminal $T_{IN}$ to the ground terminal $T_{GND}$ through the high-side driver $110_{HS}$ (particularly, through a last buffer of the tapered buffer arrangement of the high-side driver $110_{HS}$) and the clamping transistor 340 (indeed, in the absence of the charge recovery stage 135, the drain terminal of the clamping transistor 340 would be electrically connected to the ground terminal $T_{GND}$).

The low-side charge loss may be regarded as an electric charge flowing from the input terminal $T_{IN}$ to the ground terminal $T_{GND}$ through the output transistor 235 and the low-side driver $110_{LS}$ (particularly, through a last buffer of the tapered buffer arrangement of the low-side driver $110_{LS}$).

According to an embodiment, the charge recovery stage 135 comprises a storage unit, such as a storage capacitor, 405 configured to store the high-side charge loss (and to release the (stored) high-side charge loss (or at least a portion thereof) to the low-side driver $110_{LS}$).

According to an embodiment, the storage capacitor 405 is electrically coupled to the low-side supply terminal (or, equivalently, to the source terminals of the output transistors 235,240).

According to an embodiment, the storage capacitor 405 comprises a first terminal electrically coupled (e.g., directly connected) to the low-side supply terminal, and a second terminal electrically coupled (e.g., directly connected) to the ground terminal $T_{GND}$.

According to an embodiment, the charge recovery stage 135 comprises a switching unit 410. The switching unit 410 is represented in FIG. 4 by using a conventional, generic switch symbol, in that the specific implementation of the switching unit 410 is not limiting for the present invention. Indeed, without losing generality, the switching unit 410 may for example comprise a switching diode (or more thereof), a switching transistor (or more thereof), or a combination thereof.

According to an embodiment, the switching unit 410 is configured to selectively allow the high-side charge loss to flow through (so as to be stored in) the storage capacitor 405.

As conceptually represented in FIG. 4, according to an embodiment, the switching unit 410 is configured to be operated between a first operative position in which the storage capacitor 405 is allowed to receive the high-side charge loss (in the first operative position the high-side driver $110_{HS}$ being electrically coupled to the storage capacitor 405), and a second operative position in which the storage capacitor 405 is prevented from receiving the high-side charge loss (in the second operative position the high-side driver $110_{HS}$ being electrically decoupled from the storage capacitor 405).

As conceptually represented in FIG. 4, according to an embodiment, in the second operative position of the switching unit 410 the high-side charge loss is discharged to the ground terminal $T_{GND}$, which decrees the actual waste of the high-side charge loss (in the second operative position the high-side driver $110_{HS}$ being electrically coupled to the ground terminal $T_{GND}$). According to an embodiment, the switching unit 410 comprises a first terminal electrically coupled (e.g., directly connected) to the drain terminal of the clamping transistor 340 (so as to receive the high-side charge loss flowing through it from the high-side driver $110_{HS}$), and a second terminal electrically coupled to the first terminal of the storage capacitor 405 in the first operative position of the switching unit 410 or to the ground terminal $T_{GND}$ in the second operative position of the switching unit 410.

Thus, in the considered embodiment, the switching unit 410 is configured to electrically couple or decouple the high-side supply terminal to the low-side supply terminal to allow or prevent, respectively, the flow of the high-side charge loss into the storage capacitor 405.

According to an embodiment, the charge recovery stage 135 is configured to selectively store the high-side charge loss (or, equivalently, to selectively couple or decouple the high-side supply terminal to the low-side supply terminal) according to a comparison between the high-side supply voltage $V_{HS}$ and the low-side supply voltage $V_{LS}$.

According to an embodiment, the charge recovery stage 135 comprises a comparator unit 415 for performing said comparison between the high-side supply voltage $V_{HS}$ and the low-side supply voltage $V_{LS}$ and for operating the switching unit 410 according to a comparison outcome.

As conceptually represented in FIG. 4, the comparator unit 415 comprises a first input terminal electrically coupled (e.g., directly connected) to the high-side supply terminal for receiving the high-side supply voltage $V_{HS}$, a second input terminal electrically coupled (e.g., directly connected) to the low-side supply terminal for receiving the low-side supply voltage $V_{LS}$, and an output terminal for controlling the switching unit 410 according to the comparison outcome.

As conceptually represented in FIG. 4, the comparator unit 415 comprises a comparator with hysteresis: this advantageously allows avoiding, or at least strongly reducing, undesired switching of the switching unit 410 in case of spurious oscillations of the high-side supply voltage $V_{HS}$ and/or of the low-side supply voltage $V_{LS}$.

According to an embodiment, when the high-side switching device $105_{HS}$ is in the ON state (and, hence, the low-side switching device $105_{LS}$ is in the OFF state), the switching unit 410 is switched in the first operative position if the high-side supply voltage $V_{HS}$ is equal to or higher than the low-side supply voltage $V_{LS}$ (or, equivalently, if the high-side supply voltage $V_{HS}$ is equal to or higher than the supply voltage drop $V_{CC}$): in this condition, the high-side charge loss is allowed to be stored in the storage capacitor 405 without impairing the supply voltage drop $V_{CC}$ across the high-side driver $110_{HS}$ and across the low-side driver $110_{LS}$.

According to an embodiment, when the high-side switching device $105_{HS}$ is in the ON state (and, hence, the low-side switching device $105_{LS}$ is in the OFF state), the switching unit 410 is switched in the second operative position if the high-side supply voltage $V_{HS}$ is lower than the low-side supply voltage $V_{LS}$ (or, equivalently, if the high-side supply voltage $V_{HS}$ is lower than the supply voltage drop $V_{CC}$): in this condition, the high-side charge loss is prevented from being stored in the storage capacitor 405 (in order not to impair the supply voltage drop $V_{CC}$ across the high-side driver $110_{HS}$ and across the low-side driver $110_{LS}$), and is discharged to the ground terminal $T_{GND}$ (as it would occur in absence of the charge recovery stage 135).

Thus, in a basic embodiment of the present invention, the comparator unit 415 has a threshold voltage (hereinafter, comparator threshold voltage) equal to the low-side supply voltage $V_{LS}$.

According to an alternative embodiment, as better understood from the following discussion of an exemplary circuit implementation of the charge recovery stage 135, the comparator threshold voltage may be higher than the low-side supply voltage $V_{LS}$.

According to an embodiment, when the high-side switching device $105_{HS}$ is in the OFF state (and, hence, the low-side switching device $105_{LS}$ is in the ON state), irrespective of the operative position of the switching unit 410, the high-side charge loss possibly stored in the storage capacitor 405 is available to at least partially compensate for the low-side charge loss. In this condition, the following two scenarios may arise:

- if the low-side charge loss is lower than the stored high-side charge loss, then the low-side charge loss is completely compensated by the stored high-side charge loss; according to Kirchhoff's circuit laws, the remaining (unused) amount of the stored high-side charge loss (hereinafter, unused high-side charge loss) is discharged to the ground terminal $T_{GND}$ through the output transistor 240. Therefore, in this scenario, the actual charge loss affecting the switching converter 100 is determined by the unused high-side charge loss (which is a portion of the high-side charge loss), rather than by the whole high-side charge loss;
- if the low-side charge loss is higher than the stored high-side charge loss, then the low-side charge loss is partially compensated by the stored high-side charge loss; according to Kirchhoff's circuit laws, the remaining amount of the low-side charge loss that is not compensated (hereinafter, uncompensated low-side charge loss) is taken from the input terminal $T_{IN}$ through the output transistor 235. Therefore, in this scenario, the actual charge loss affecting the switching converter 100 is determined by the uncompensated low-side charge loss (which is a portion of the low-side charge loss), rather than by the whole low-side charge loss.

Therefore, in both scenarios, power loss optimization is achieved.

Figure 5:
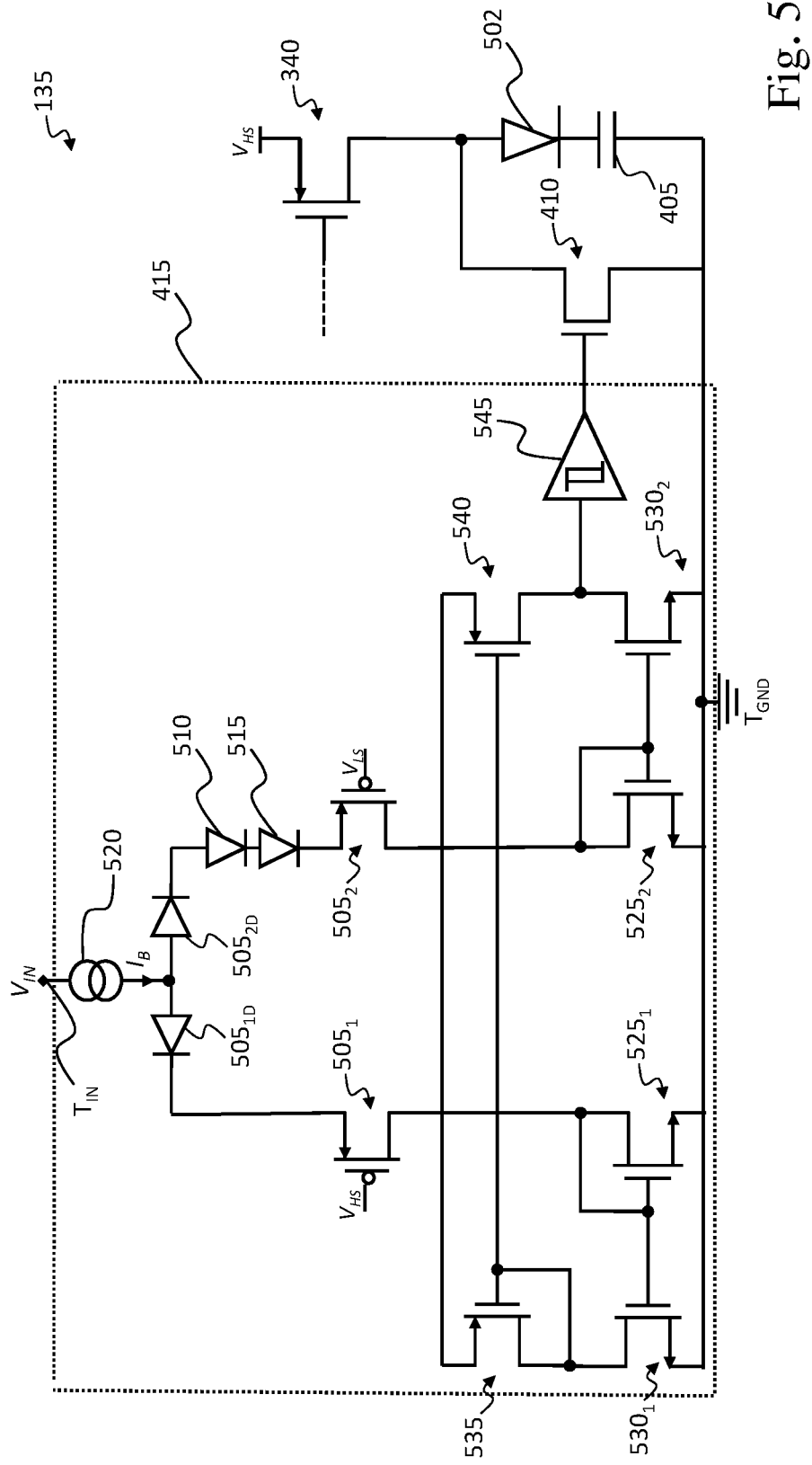
FIG. 5 shows a circuit implementation of a charge recovery stage of the switching converter, according to an embodiment of the present invention.

A circuit implementation of the charge recovery stage 135 according to an embodiment of the present invention is shown in FIG. 5.

According to an embodiment, the switching unit 410 comprises a transistor (e.g., a NMOS transistor), having a gate terminal electrically coupled (e.g., directly connected) to the output terminal of the comparator unit 415, a source terminal electrically coupled (e.g., directly connected) to the ground terminal $T_{GND}$, and a drain terminal electrically coupled (e.g., directly connected) to the low-side supply terminal and to the drain terminal of the clamping transistor 340.

According to an embodiment, the charge recovery stage 135 comprises a protection diode 502. According to an embodiment, the protection diode 502 has a cathode terminal electrically coupled (e.g., directly connected) to the drain terminal of the transistor implementing the switching unit 410 and an anode terminal electrically coupled (e.g., directly connected) to the first terminal of the storage capacitor 405.

According to an embodiment, the comparator unit 415 comprises a conventional input differential stage.

According to an embodiment, the input differential stage comprises a first input transistor (for example, a PMOS transistor) $505_1$ and a second input transistor (for example, a PMOS transistor) $505_2$ coupled to each other in a conventional differential configuration (in the following, the first $505_1$ and second $505_2$ input transistors will be also globally denoted as input transistors $505_1,505_2$ when distinguishing between the first $505_1$ and second $505_2$ input transistors is not relevant for the understanding of the present invention).

According to an embodiment, the first input transistor $505_1$ has a gate terminal electrically coupled to the high-side supply terminal for receiving the high-side supply voltage $V_{HS}$ (the gate terminal of the first input transistor $505_1$ thus representing the first input terminal of the comparator unit 415), and source and drain terminals, and the second input transistor $505_2$ has a gate terminal electrically coupled to the low-side supply terminal for receiving the low-side supply voltage $V_{LS}$ (the gate terminal of the second input transistor $505_2$ thus representing the second input terminal of the comparator unit 415), a source terminal electrically coupled to the source terminal of the first input transistor $505_1$, and a drain terminal. According to an embodiment, as better discussed here below, the drain terminals of the first $505_1$ and second $505_2$ input transistors are coupled to a current mirror arrangement.

According to an embodiment, the input differential stage comprises a first input diode (or other electronic component, such as one or more resistors) $505_{1D}$ and a second input diode (or other electronic component, such as one or more resistors) $505_{2D}$ electrically coupled to the first $505_1$ and second $505_2$ input transistors, respectively. According to an embodiment, the first input diode $505_{1D}$ has a cathode terminal electrically coupled (e.g., directly connected) to the source terminal of the first input transistor $505_1$, and the second input diode $505_{2D}$ has a cathode terminal electrically coupled (e.g., directly connected) to the source terminal of the second input transistor $505_2$. According to an embodiment, the anode terminals of the first $505_{1D}$ and second $505_{2D}$ input diodes are electrically coupled (e.g., directly connected) to each other.

According to an embodiment, the input differential stage comprises one or more electronic components for setting a comparator threshold voltage higher than the low-side supply voltage $V_{LS}$. According to an embodiment, the electronic components comprise one or more diodes electrically coupled between the source terminals of the input transistors $505_1,505_2$. According to an embodiment, the electronic components comprise a first diode 510 having an anode terminal electrically coupled (e.g., directly connected) to the source terminal of the first input transistor $505_1$, and a second diode 515 having an anode terminal electrically coupled (e.g., directly connected) to a cathode terminal of the first diode 510, and a cathode terminal electrically coupled (e.g., directly connected) to the source terminal of the second input transistor $505_2$.

In this configuration, the comparator threshold voltage is:

$$V_{HS}=V_{LS}+2*V_{DIODE}$$

wherein $V_{DIODE}$ is the voltage across each diode 510,515.

In alterative embodiments (not shown), a different number of diodes may be used to set the comparator threshold voltage.

In alternative embodiments (not shown), electronic components other than diodes may be used to set the comparator threshold voltage. Just as an example, one or more resistors and/or one or more transistors may be used additionally or alternatively to diodes.

According to an embodiment, the comparator unit 415 comprises a bias current source 520, generally represented through the conventional electric symbol for ideal current generator, for generating a bias current $I_B$.

According to an embodiment, the bias current source 520 is electrically coupled between the input terminal $T_{IN}$ and the source terminals of the input transistors 505$_1$,505$_2$. In the considered example, the bias current source 520 is directly connected between the input terminal $T_{IN}$ and the anode terminals of the first 505$_{1D}$ and second 505$_{2D}$ input diodes.

According to well-known electronic principles, depending on a difference between the high-side supply voltage $V_{HS}$ and the low-side supply voltage $V_{LS}$, the bias current $I_B$ is allowed to (completely or substantially completely) flow through the first input transistor 505$_1$ or through the second input transistor 505$_2$. Particularly, if the high-side supply voltage $V_{HS}$ is equal to or higher than the comparator threshold voltage, the second input transistor 505$_2$ is more conductive than the first input transistor 505$_1$ and the bias current $I_B$ is allowed to completely or substantially completely flow through the second input transistor 505$_2$, otherwise the first input transistor 505$_1$ is more conductive than the second input transistor 505$_2$ and the bias current $I_B$ is allowed to completely or substantially completely flow through the first input transistor 505$_1$.

According to an embodiment, the comparator unit 415 comprises a current mirror arrangement for mirroring the bias current $I_B$ flowing through the first input transistor 505$_1$ or through the second input transistor 505$_2$ towards the output terminal of the comparator unit 415.

According to an embodiment, the current mirror arrangement comprises a first mirroring transistor 525$_1$,525$_2$ (e.g., a NMOS transistor) having a source terminal electrically coupled (e.g., directly connected) to the ground terminal $T_{GND}$, a drain terminal electrically coupled (e.g., directly connected) to the drain terminal of the input transistor 505$_1$,505$_2$, respectively, and a gate terminal electrically connected to the respective drain terminal (the first mirroring transistor 525$_1$,525$_2$ being thus in diode-connected configuration), a second mirroring transistor 530$_1$,530$_2$ (e.g., a NMOS transistor) having a source terminal electrically coupled (e.g., directly connected) to the ground terminal $T_{GND}$, and a gate terminal electrically coupled (e.g., directly connected) to the gate terminal of the respective first mirroring transistor 525$_1$,525$_2$, a third mirroring transistor 535 (e.g., a PMOS transistor) having a source terminal electrically coupled (e.g., directly connected) to the low-side supply terminal for receiving the low-side supply voltage $V_{LS}$, a drain terminal electrically coupled (e.g., directly connected) to the drain terminal of the second mirroring transistor 530$_1$, and a gate terminal electrically connected to the respective drain terminal (the third mirroring transistor 535 being thus in diode-connected configuration), and a fourth mirroring transistor 540 (e.g., a PMOS transistor) having a source terminal electrically coupled (e.g., directly connected) to the low-side supply terminal for receiving the low-side supply voltage $V_{LS}$, a drain terminal electrically coupled (e.g., directly connected) to the drain terminal of the second mirroring transistor 530$_2$, and a gate terminal electrically coupled (e.g., directly connected) to the gate terminal of the third mirroring transistor 535.

According to well-known principles of the current mirrors, the first 525$_1$, second 530$_1$, and third 535 mirroring transistors are configured to mirror the bias current $I_B$ flowing through the first input transistor 505$_1$ to the fourth mirroring transistor 540, which decrees an increase in the voltage (hereinafter, drain voltage) at the drain terminal thereof (and, hence, at the output terminal of the comparator unit 415, as better discussed here below), whereas the first mirroring transistor 525$_2$ is configured to mirror the bias current $I_B$ flowing through the second input transistor 505$_2$ to the second mirroring transistor 530$_2$, which decrees a decrease in the drain voltage at the drain terminal thereof (and, hence, at the output terminal of the comparator unit 415, as better discussed here below).

According to an embodiment, the comparator unit 415 comprises a buffer unit 545 having an input terminal electrically coupled (e.g., directly connected) to the drain terminals of the second 530$_2$ and fourth 540 mirroring transistors for receiving the drain voltage therefrom, and an output terminal electrically coupled (e.g., directly connected) to the gate terminal of the transistor implementing the switching unit 410 (the output terminal of the buffer unit 545 thus acting as the output terminal of the comparator unit 415) for providing a regenerated version of the drain voltage (so as to properly control the switching unit 410).

According to an embodiment, as conceptually represented in FIG. 5, the buffer unit 545 comprises a buffer with hysteresis, so as to avoid, or at least strongly reduce, undesired switching of the switching unit 410 in case of spurious oscillations of the drain voltage due to corresponding spurious oscillations in the high-side supply voltage $V_{HS}$ and/or in the low-side supply voltage $V_{LS}$. The operation of the charge recovery stage 135 may be summarized as follows. When the high-side switching device 105$_{HS}$ is in the ON state, if the high-side supply voltage $V_{HS}$ is higher than the comparator threshold voltage, the second input transistor 505$_2$ is more conductive than the first input transistor 505$_1$ and the bias current $I_B$ is allowed to completely or substantially completely flow through the second input transistor 505$_2$, thereafter the bias current $I_B$ is mirrored by the first mirroring transistor 525$_2$ to the second mirroring transistor 530$_2$. This causes a decrease in the drain voltage, which determines the switching unit 410 to be switched in the OFF state, and hence the high-side charge loss from the high-side driver 110$_{HS}$ to be stored in the storage capacitor 405.

Otherwise, if the high-side supply voltage $V_{HS}$ is lower than the comparator threshold voltage, the first input transistor 505$_1$ is more conductive than the second input transistor 505$_2$ and the bias current $I_B$ is allowed to completely or substantially completely flow through the first input transistor 505$_1$, thereafter the bias current $I_B$ is mirrored by the first 525$_1$, second 530$_1$, and third 535 mirroring transistors to the fourth mirroring transistor 540. This causes an increase in the drain voltage, which determines the switching unit 410 to be switched in the ON state and hence the high-side charge loss from the high-side driver 110$_{HS}$ to be discharged towards the ground terminal $T_{GND}$ thorough the switching unit 410.

Figure 6:
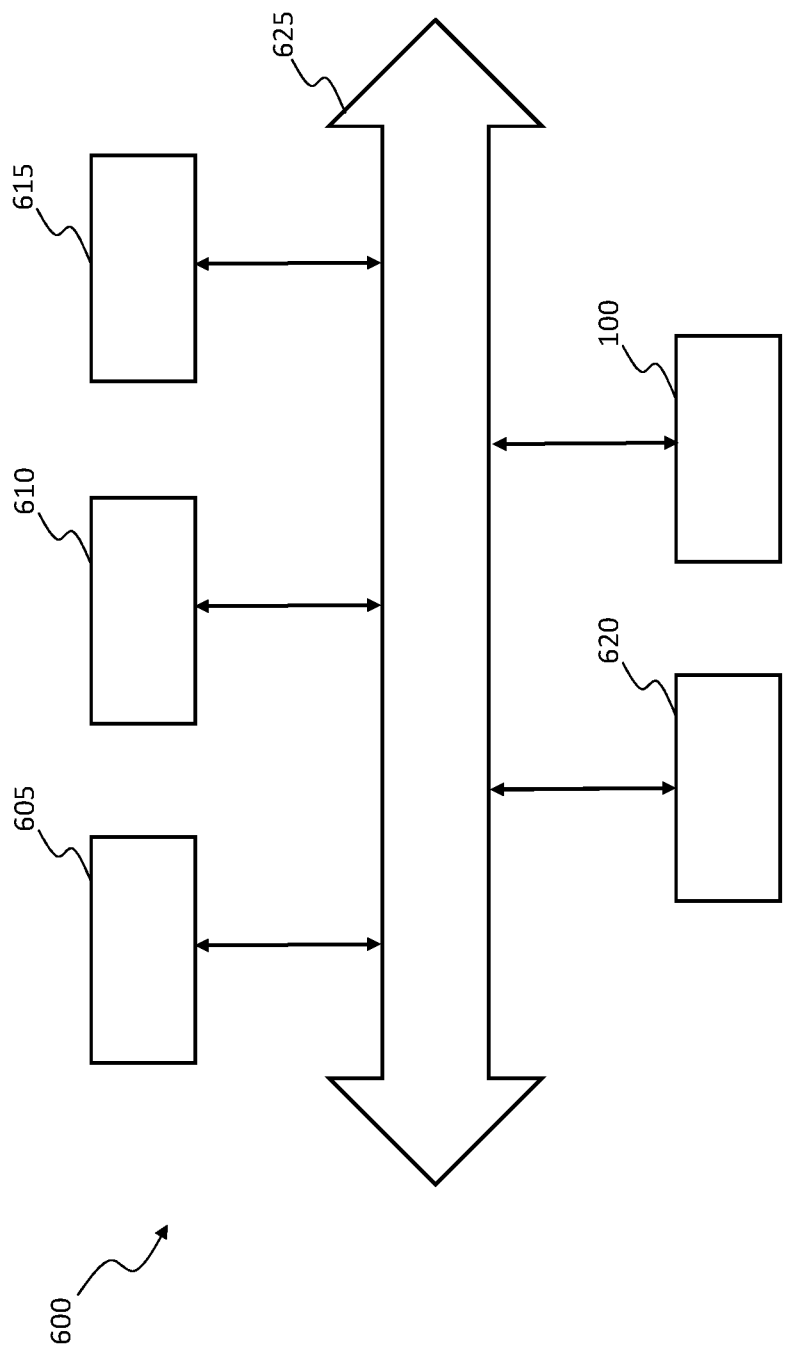
FIG. 6 shows a simplified block diagram of an electronic system comprising the switching converter, according to an embodiment of the present invention.

With reference now to FIG. 6, it shows a simplified block diagram of an electronic system 600 (i.e., a portion thereof) comprising the switching converter 100 (or more thereof) according to an embodiment of the present invention.

According to an embodiment, the electronic system 600 is suitable for use in any electronic apparatus.

According to an embodiment, the electronic system 600 comprises a controller 605 (for example, one or more microprocessors and/or one or more microcontrollers).

According to an embodiment, the electronic system 600 comprises an input/output device 610 (for example, a keyboard and/or a screen). The input/output device 610 may for example be used to generate and/or receive messages. The input/output device 610 may for example be configured to receive/supply a digital signal and/or an analog signal.

According to an embodiment, the electronic system 600 comprises a wireless interface 615 for exchanging messages with a wireless communication network (not shown), for example by using radio frequency (RF) signals. Examples of a wireless interface may include antennas and wireless transceivers.

According to an embodiment, the electronic system 600 comprises a power supply device (for example, a battery) 620 for powering the electronic system 600.

According to an embodiment, the electronic system 600 comprises one or more communication channels (bus) 625 to allow the exchange of data between the switching converter 100, the controller 605 (when provided), the input/output device 610 (when provided), the wireless interface 615 (when provided), and the power supply device 620 (when provided).

Naturally, in order to satisfy local and specific requirements, a person skilled in the art may apply to embodiments of the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

In particular, similar considerations apply if the switching converter has a different structure or includes equivalent components. In any case, any component thereof may be separated into several elements, or two or more components may be combined into a single element; furthermore, each component can be replicated to support the execution of the corresponding operations in parallel. It should also be noted that (unless otherwise indicated) any interaction between different components generally does not need to be continuous, and may be either direct or indirect through one or more intermediaries.

What is claimed is:

1. A switching converter for converting a direct current input voltage into a direct current output voltage, the switching converter comprising:
   a switching stage comprising first and second switching devices configured to receive the direct current input voltage and provide the direct current output voltage according to the direct current input voltage;
   a driving stage comprising first and second driving devices configured to drive the first and second switching devices, respectively;
   a current sensing circuit configured to sense an output current provided by the switching stage;
   a voltage generation circuit comprising first and second voltage generation stages, the first voltage generation stage configured to generate a first supply voltage to power the second driving device according to the output current, the second voltage generation stage configured to generate a second supply voltage to power the first driving device according to a reference voltage corresponding to the first supply voltage, the voltage generation circuit configured to adjust the first or second supply voltages according to the output current sensed by the current sensing circuit; and
   a charge recovery stage configured to;
      selectively store a first electric charge being lost from the first driving device during driving of the first switching device based on a comparison between the first and second supply voltages, and
      release, at least partially, the first electric charge to the second driving device during driving of the second switching device to, at least partially, compensate for a second electric charge being lost from the second driving device during driving of the second switching device.

2. The switching converter of claim 1, wherein the first and second supply voltages are configured to provide a same supply voltage drop powering to the first and second driving devices, and wherein the charge recovery stage is configured to allow the first electric charge to be stored when the second supply voltage is higher than the first supply voltage, or to prevent the first electric charge to be stored when the second supply voltage is lower than the first supply voltage.

3. The switching converter of claim 1, wherein the charge recovery stage comprises:
   a storage capacitor configured to store the first electric charge;
   a switching circuit configured to selectively allow or prevent the first electric charge to flow into the storage capacitor; and
   a comparator circuit configured to operate the switching circuit according to a comparison between the first and second supply voltages.

4. The switching converter of claim 3, wherein the charge recovery stage further comprises a protection diode having an anode coupled to the switching circuit and a cathode coupled to the storage capacitor.

5. The switching converter of claim 3, wherein the comparator circuit has hysteresis.

6. The switching converter of claim 3, wherein the first voltage generation stage comprises a decoupling stage configured to receive the reference voltage and to provide the first supply voltage to a first supply terminal while electrically decoupling the first voltage generation stage and the second driving device to each other, the storage capacitor being electrically coupled to the first supply terminal.

7. The switching converter of claim 6, wherein the second voltage generation stage comprises a first impedance network configured to receive the first supply voltage and to provide a corresponding further reference current, a second impedance network, equal to the first impedance network, configured to receive the direct current input voltage and the further reference current and to provide the second supply voltage to a second supply terminal, the switching circuit electrically coupling or decoupling the second supply terminal to the first supply terminal to allow or prevent, respectively, the flow of the first electric charge into the storage capacitor.

8. The switching converter of claim 7, wherein the first voltage generation stage comprises a reference current generator configured to generate a reference current adjustable according to the output current, and a reference voltage generator configured to generate the reference voltage according to the reference current, and wherein the reference voltage generator comprises a third impedance network, the second voltage generation stage sharing the first impedance network with the reference voltage generator of the first voltage generation stage.

9. The switching converter of claim 1, wherein the switching converter is a buck converter, a boost converter, or a buck-boost converter.

10. An electronic system comprising:
a controller;
a power source; and
a switching converter comprising:
   a switching stage comprising first and second switching devices configured to receive an input voltage and provide an output voltage,
   a driving stage comprising first and second driving devices configured to drive the first and second switching devices, respectively,
   a current sensing circuit configured to sense an output current provided by the switching stage,
a voltage generation circuit comprising first and second voltage generation stages, the first voltage generation stage configured to generate a first supply voltage to power the second driving device according to the output current, the second voltage generation stage configured to generate a second supply voltage to power the first driving device according to a reference voltage corresponding to the first supply voltage, the voltage generation circuit configured to adjust the first or second supply voltages according to the output current sensed by the current sensing circuit, and
a charge recovery stage configured to:
   selectively store a first electric charge being lost from the first driving device during driving of the first switching device based on a comparison between the first and second supply voltages, and
   release, at least partially, the stored first electric charge to the second driving device during driving of the second switching device to, at least partially, compensate for a second electric charge being lost from the second driving device during driving of the second switching device.

11. The electronic system of claim 10, further comprising a wireless interface, wherein the power source comprises a battery.

12. The switching converter of claim 10, wherein the charge recovery stage comprises:
a storage capacitor configured to store the first electric charge;
a switching circuit configured to selectively allow or prevent the first electric charge to flow into the storage capacitor; and
a comparator circuit configured to operate the switching circuit according to a comparison between the first and second supply voltages.

13. The switching converter of claim 12, wherein the first voltage generation stage comprises a decoupling stage configured to receive the reference voltage and to provide the first supply voltage to a first supply terminal while electrically decoupling the first voltage generation stage and the second driving device to each other, the storage capacitor being electrically coupled to the first supply terminal.

14. The switching converter of claim 13, wherein the second voltage generation stage comprises a first impedance network configured to receive the first supply voltage and to provide a corresponding further reference current, a second impedance network, equal to the first impedance network, configured to receive the input voltage and the further reference current and to provide the second supply voltage to a second supply terminal, the switching circuit electrically coupling or decoupling the second supply terminal to the first supply terminal to allow or prevent, respectively, the flow of the first electric charge into the storage capacitor.

15. The electronic system of claim 12, wherein the charge recovery stage comprises a protection diode having an anode coupled to the switching circuit and a cathode coupled to the storage capacitor.

16. A method for converting a direct current input voltage into a direct current output voltage with a switching converter, the method comprising:
driving a switching stage of the switching converter with a driving stage of the switching converter, wherein the switching stage comprises first and second switching devices for receiving the direct current input voltage and for providing the direct current output voltage according to the direct current input voltage, and wherein the driving stage comprises first and second driving devices for driving the first and second switching devices, respectively;
sensing an output current provided by the switching stage;
generating first and second supply voltages to, respectively, power the second and first driving devices, wherein generating the first supply voltage comprises adjusting the first supply voltage according to the output current being sensed, and wherein generating the second supply voltage comprises generating the second supply voltage based on a reference voltage corresponding to the first supply voltage; and
selectively storing a first electric charge being lost from the first driving device during driving of the first switching device based on a comparison between the first and second supply voltages, and
releasing, at least partially, the stored first electric charge to the second driving device during driving of the second switching device to, at least partially, compensate for a second electric charge being lost from the second driving device during driving of the second switching device.

17. The method of claim 16, wherein selectively storing the first electric charge comprises controlling a switching circuit having a first terminal coupled to a storage capacitor, a second terminal coupled to a first supply terminal with an output of a comparator circuit for comparing the first and second supply voltages.

18. The method of claim 17, further comprising providing the first supply voltage to the first supply terminal while electrically decoupling the second driving device from a first voltage generation stage used to generate the first voltage supply.

19. The method of claim 16, wherein the direct current output voltage is lower than the direct current input voltage.

20. The method of claim 16, wherein the switching converter is a buck converter, a boost converter, or a buck-boost converter.

* * * * *

UNITED STATES PATENT AND TRADEMARK OFFICE
CERTIFICATE OF CORRECTION

PATENT NO. : 11,888,384 B2
APPLICATION NO. : 17/532833
DATED : January 30, 2024
INVENTOR(S) : Brambilla et al.

It is certified that error appears in the above-identified patent and that said Letters Patent is hereby corrected as shown below:

In the Claims

In Column 24, in Claim 1, Line 9, delete "to;" and insert -- to: --.

In Column 25, in Claim 10, Line 33, delete "to;" and insert -- to: --.

Signed and Sealed this
Thirtieth Day of April, 2024

Katherine Kelly Vidal
*Director of the United States Patent and Trademark Office*